(12) United States Patent
Omura et al.

(10) Patent No.: US 6,330,399 B1
(45) Date of Patent: Dec. 11, 2001

(54) PHOTOGRAPHIC CAMERA

(75) Inventors: Hiroshi Omura; Seimei Ushiro, both of Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/536,701

(22) Filed: Mar. 28, 2000

(30) Foreign Application Priority Data

Mar. 29, 1999 (JP) .................................................. 11-085803

(51) Int. Cl.⁷ ............................ G03B 15/03; G03B 17/00
(52) U.S. Cl. .................................. 396/60; 396/61; 396/67; 396/89
(58) Field of Search .................................. 396/60, 61, 65, 396/67, 89

(56) References Cited

U.S. PATENT DOCUMENTS 4,583,831 * 4/1986 Harvey ..................................... 396/60

* cited by examiner

Primary Examiner—W. B. Perkey
(74) Attorney, Agent, or Firm—Young & Thompson

(57) ABSTRACT

A photographic camera changeable between a normal photographic mode in which an almost entire area of an exposure frame of a photographic film is exposed with an intention of making a print from the exposure frame with a normal printing magnification and a pseudo magnified photographic mode in which a specific partial area of an exposure frame of a photographic film is exposed with an intention of making a print from the exposure frame with a larger printing magnification than the normal printing magnification and able to record trimming-data of an exposure frame exposed in the pseudo magnified photographic mode on the photographic film and is intended to be used in printing process comprises a distance measuring device having a measurement range greater than a focusing range of the taking lens, a lens setting mechanism for setting the taking lens in fixed positions including positions for the closest focussing distance and for infinity in accordance with camera-to-subject distance measured by the distance measuring device, and a control unit for setting the taking lens in the position for the closest focussing distance when exposure is made in the pseudo magnified photographic mode for a subject located between the closest focussing distance and the extreme end distance of the measurement range of the distance measuring device.

3 Claims, 6 Drawing Sheets

PHOTOGRAPHIC CAMERA

BACKGROUND OF THE INVENTION

1. Field of the Invention

The present invention relates to a photographic camera having a pseudo close-up photographic effect on the premise that a photographic film exposed by the photographic camera is processed by trimming printing in which a magnified print is made from a specific partial area of an exposed frame of the photographic film.

2. Related Background Art

Typically, popular cameras have normal ranges of camera-to-subject distances that are from approximately one meter to infinity. Some cameras are equipped with a close-up photographic feature that makes the camera possible to focus on an aimed subject at a camera-to-subject distance of approximately 0.4–0.5 meters in addition to the normal range of camera-to-subject distances. Such a camera needs an additional mechanism to shift a focussing lens to a position for taking a close-up photograph beyond positions for taking a normal photograph. A distance of required focussing lens movement for focusing depends on a camera-to-subject distance even if a change in camera-to-subject distance is the same. That is, the closer the camera-to-subject distance become, the longer the distance of required focussing lens movement changes even if a change in camera-to-subject distance is the same. For example, the distance of required focussing lens movement when focusing on an aimed subject in a shorter range of camera-to-subject distances from 1 m to 2 m is longer than that when focusing on an aimed subject in a longer range of camera-to-subject distances from 4 m to 5 m. It is apparent that an extent of focussing lens movement has to be greatly expanded on a short distance side beyond the normal range of camera-to-subject distances for normal photography in order to make the camera possible to focus on an aimed subject at a distance of 0.4 to 0.5 m beyond the normal range of camera-to-subject distances.

Some cameras equipped with zoom lenses are capable of taking a close-up photograph by shifting a specific lens for focussing, or otherwise, by removably inserting a conversion lens into the optical path of the zoom lens, after setting the zoom lens in a position for the wide-angle end (the shortest focal length of the zoom lens), or in a position for the telephoto end (the longest focal length of the zoom lens). Such a zoom-lens equipped camera also needs an additional mechanism to shift the specific lens into a position for close-up photography beyond positions for normal photography in addition to a lens shift mechanism for shifting the focussing lens into positions for a normal range of camera-to-subject distances.

To meet such requirements, the conventional cameras equipped with a close-up photographic feature are provided with a lens shift mechanism that shifts one or more focusing lenses of a taking lens that are used to take a normal photograph in the normal range of camera-to-subject distances into a position for the closest focusing distance, i.e. the closest camera-to-subject distance, when taking a close-up photograph, or otherwise shifts a specific lens other than the focusing lens to a position for the closest focusing distance when taking a close-up photograph. Incorporating the lens shift mechanism, which is complicated in structure, makes the lens barrel large in size and complicated in mechanism. For this reason, equipping the camera with a close-up photographic feature is one of causes of preventing the camera from being produced at low costs and made light and compact in size.

A trimming printing system has been known in the photographic art as desclosed in, for example, Japanese Unexamined Patent Publication No. 54-26721. This printing system has been materiarized on the basis of the fact that makng a print of a partial area of an exposed frame of a photographic film with a printing magnification greater than a normal printing magnification usually used for making a regular size of print from the exposed frame provides like an effect of close-up photogrpy. In order to enjoying the benefit of the trimming printing system, a camera is equipped with means for recording data indicating that exposure made with an intention of close-up photography.

SUMMARY OF THE INVENTION

It is an object of the present invention to provide a photographic camera which provides a close-up photographic effect by using a pseudo magnified photographic technique without imposing somewhat troublesome camera operation on the photographer.

It is another object of the present invention to provide a photographic camera that is manufactured without bringing about an increase in production costs and imposing restraint on a demand for a small and light camera even having a close-up photographic feature.

It is still another object of the present invention to provide a photographic camera which automatically changes the operative mode of the camera to a pseudo magnified photographic mode when it is detected that a close-up photography is tried.

The above objects of the present invention is accomplished in a photographic camera of a type that is changeable in photographic mode between a normal photographic mode in which an almost entire area of an exposure frame of a photographic film is exposed with an intention of making a print from an almost entire area of an exposure frame with a normal printing magnification and a pseudo magnified photographic mode in which a specific partial area of an exposure frame of a photographic film is exposed with an intention of making a print from the specific partial area of the exposure frame with a larger printing magnification than the normal printing magnification and records data of exposure for a specific exposure frame (trimming-data) which indicates that the specific exposure frame has been exposed in the pseudo magnified photographic mode on the photographic film and is intended to be used in printing process. The photographic camera of the present invention comprises distance measuring means for measuring a camera-to-subject distance, which has an extended measurement range having an extreme end distance from the photographic camera shorter than the closest focussing distance of a taking lens by a predetermined distance, lens setting means for setting the taking lens in position between a closest focusing position for the focusing distance to a remotest focusing position for an infinity focusing distance for infinity in accordance with a camera-to-subject distance measured by the distance measuring means, and control means for setting the taking lens in the closest focussing distance and causing a change in photographic mode from the normal photographic mode to the pseudo magnified photographic mode when the distance measuring means detects a camera-to-subject distance between the closest focussing distance and the extreme end distance.

The control means may implement automatic exposure control such that an electronic flash device built-in the photographic camera is automatically actuated to flash under a condition that an aperture of the taking lens is stopped down below a predetermined value when a camera-to-subject distance of an aimed subject is between the closest focussing distance and the extreme end distance. It may be preferable to incorporate a view finder of a type capable of displaying a view field frame in conformity with the specific partial area of an exposure frame and having a mechanism for making a parallax correction of a field of view thereof. In the photographic camera equipped with the view finder thus structured, the control means causes the view finder to display the view field frame and actuate the parallax correction mechanism when a camera-to-subject distance of an aimed subject is between the closest focussing distance and the extreme end distance.

According to the present invention, the photographic camera provides an effect of close-up photography without incorporating a special mechanism for shifting a focusing lens beyond a range of focusing lens movement for normal photography, so as to avoid an increase in production costs and restraint on compactness. Since the photographic camera automatically implements automatic flash exposure under the condition that an aperture of the taking lens is stopped down below a predetermined value when a camera-to-subject distance of an aimed subject is between the closest focussing distance and the extreme end distance, even though the taking lens is focused less sharply on the subject, the image of the subject has sharpness so sufficient to have a sufficiently acceptable image quality and the exposure is proper due to a flash. Further, ince the view finder displays the view field frame in conformity with the specific partial area of an exposure frame and makes a proper parallax correction when a camera-to-subject distance of an aimed subject is between the closest focussing distance and the extreme end distance, a print picture after trimming printing is checked during exposure and an aimed object can be framed so as to position at a center of a print.

BRIEF DESCRIPTION OF THE DRAWINGS

The above and other objects and features will be more clearly understood from the following detailed description of the preferred embodiments thereof when reading in conjunction with the accompanying drawings, in which.

DESCRIPTION OF THE PREFERRED EMBODIMENT

Figure 1:
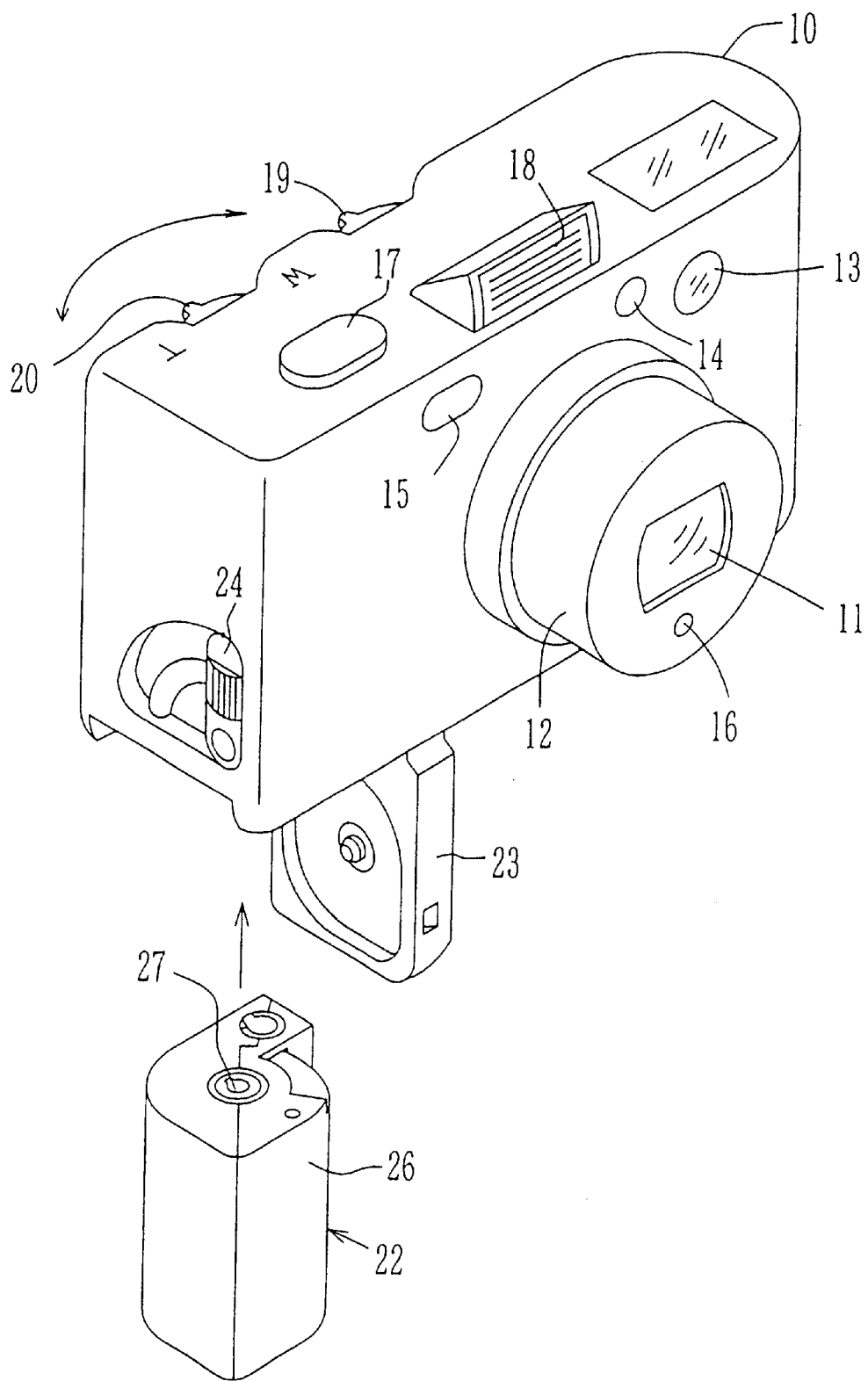
FIG. 1 is a perspective view of a photographic camera in accordance with a preferred embodiment of the present invention.

Referring to the drawings in detail, and, in particular, to FIG. 1 which shows a photographic camera in accordance with a preferred embodiment of the present invention, the photographic camera has a camera body 10 which is provided with a lens barrel 12 with a taking lens 11 installed therein. The taking lens 11 is a zoom lens which can vary its focal length continuously between a shortest setting, namely a wide-angle end, and a largest setting, namely a telephoto end. An objective lens 13 of a zoom finder optical system, and a light emitting window 14 and a light receiving window 15 which form an active type of distance measuring device are mounted to the front wall. The light emitting window 14 and the light receiving window 15 are covered with optical filters which cut visible light and allow infrared light to path through. Behind the light emitting window 14 there is located a light emitting element that emits near infrared light toward an aimed subject in the photographic field, and behind the light receiving window 15 there is a photoelectric element that is sensitive to near infrared light and receives near infrared light reflected by the aimed subject. The camera body 10 is provided with a light metering element (not shown) disposed behind a light metering window 16 in the front wall to measure brightness of the aimed subject. The camera body 10 at the top is further provided with a shutter release button 17, an electronic flash device 18. In the upper portion of the back of the camera body 10, there is provided a photographic mode selecting switch 19 which is operative to select a normal photographic mode and a pseudo magnified photographic mode. The normal photographic mode is referred to photography that is used with an intention to make a print from an almost entire area of an exposed frame of a photographic film with a normal printing magnification. The pseudo magnified photographic mode is referred to photography that is used with an intention to make a print from a particular portion of an exposed frame of the photographic film, which has roughly the same aspect ratio as the entire exposure frame, with a larger printing magnification than the normal printing magnification. In this sense the pseudo magnified photographic mode is otherwise called a trimming photographic mode. Upon selection of the pseudo magnified photographic mode, the field of view of the finder is changed. When making exposure in the pseudo magnified photographic mode, data indicating the fact that exposure is made in the pseudo magnified photographic mode (which is hereafter referred to as trimming-data) is magnetically, or otherwise may be optically, recorded on the photographic film. In the case where an IC (integrated circuit) memory is incorporated in a film cartridge, electronic recording is also available to enter trimming-data into the IC memory. A zooming knob 20 operative to cause zooming operation of the taking lens 11 is disposed adjacent to the photographic mode selecting switch 19. At the left side end of the camera body 10, a swing lock 24 operative to lock and unlock a bottom lid 23 of a film cartridge chamber for receiving a film cartridge 22 therein is installed. The swing lock 24 in a position shown in FIG. 1 unlocks the bottom lid 23. When closing the bottom lid 23, the swing lock 24 is turned counterclockwise by the bottom lid 123 and locks the bottom lid 23. The film cartridge 22 has a cartridge housing 26 and a spool 27 supported for rotation in the cartridge 26. A photographic film 48 (see FIG. 2) which has a transparent magnetic layer coated on the back thereof is rolled around the spool 27. The film cartridge 22 has a mechanism for thrusting the photographic film 48 out of the film cartridge 22 by turning the spool 27 therein.

Figure 2:
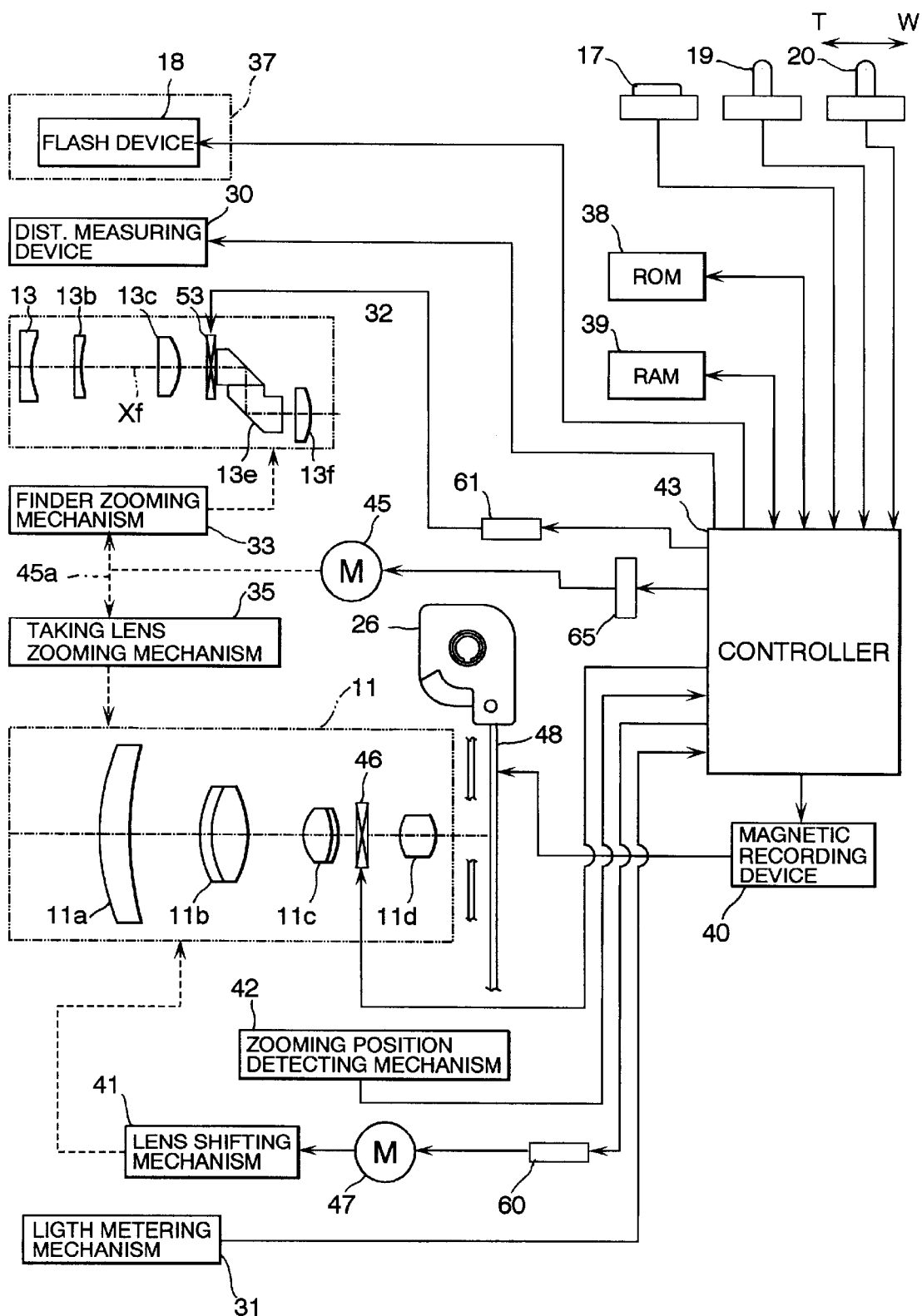
FIG. 2 is a schematic block diagram illustrating essential components of the photographic camera.

FIG. 2 is an illustration schematically showing the photographic camera with essential components thereof. In the photographic camera installed are, in addition to the taking lens 11, a distance metering device 30, a light metering mechanism 31, a zoom finder optical system 32, a finder zooming mechanism 33, a taking lens zooming mechanism 35, a film feeding mechanism 36, an electronic flash circuit 37, a magnetic recording device 40, a focussing lens shifting mechanism 41, a zoom position detecting mechanism 42 and a controller 43 accompanied by ROM 38 and RAM 39 for implementing totally organized control for these components and mechanisms. A program and data for a microcomputer of the controller 43 to implement various control on these components and mechanisms are stored in ROM 38. RAM 39 is used as a work memory of the controller 43 to temporarily store parameters and data for the control. The photographic mode selecting switch 19, zoom lever 20 and shutter release button 17 are all electrically connected to the controller 43 so as to input a mode selecting signal, a zooming signal and a shutter release signal into the controller, respectively. The shutter release signal comprises a half-depression signal that is generated in response to half-depression of the shutter release button 17 and a full-depression signal that is generated in response to subsequent full depression of the shutter release button 17. The controller 43 actuates a zooming motor 45 by way of a driver 65 in response the zooming signal. The taking lens 11 consists of a first lens group 11a, a second lens group 11b, a third lens group 11c and a fourth lens group 11d arranged in order from the subject side. The first lens group 11a, which is a focussing lens in this embodiment, functions to achieve focusing. The zooming motor 45 drives the taking lens zooming mechanism 35 which comprises, for example, a cam mechanism and a helicoid mechanism for causing the second lens group 11b and the third lens group 11c to shift relatively to each other and the focusing lens 11a along the optical axis Xo such that the focal length of the taking lens 11 continuously changes as an axial distance between the second lens group 11b and the third lens group 11c changes. The zoom position detecting mechanism 42 comprises, for example, am encoder disk and a blush and detects axial distances that is traveled by the second lens group 11b and the third lens group 11c. The lens position detecting mechanism 42 transmits a distance signal representative of the distance to the controller 43 in real time. The controller 43 recognizes present positions of the second lens group 11b and the third lens group 11c based on the distance signal. A programmed shutter 46 is located between the third lens group 11c and the fourth lens group 11d. The programmed shutter 46 and the third lens group 11c move together as one whole. The controller 43 controls the aperture of the programmed shutter 43 based on brightness of an aimed subject so as to make proper exposure.

The focussing lens shift mechanism 41 includes an electric motor 47 to cause axial movement of the focussing lens 11a along the optical axis Xo for focussing. A position of the focussing lens 11 for (which is hereafter referred to as a focussing lens set position) depends upon an adjusted focal length of the taking lens 11 and a camera-to-subject distance of the subject on which the taking lens 11 is focused. Data of the relationship between focussing lens set position and camera-to-subject distance is pre-stored in ROM 38. More specifically, the focussing lens set positions are predetermined corresponding to camera-to-subject distances (focusing zones) that are detectable by the distance measuring device 30 as will be described in detail later. The zoom finder optical system 32 is of a real-image type, which is constituted by the objective lens 13, a lens group comprises two lens elements 13b and 13c, an erecting prism 13e and an eyepiece lens 13f. The finder zooming mechanism 33, which is driven by the zooming motor 45, shifts the lens elements 13b and 13c along the optical axis Xf of the zoom finder optical system 32 so that the zoom finder optical system 32 changes its field of view in conformity with the field of view of the taking lens 11. A transparent liquid crystal display device (LCD) 53 is disposed in a position in which a real image is formed by the zoom finder optical system 33. The controller 43 actuates LCD 53 to display a view field frame line indicating the field of view of the zoom finder optical system 32 when selecting the pseudo magnified photographic mode such that the view field frame of the zoom finder conforms with a particular portion of the exposure frame of the photographic film 48. Further the controller 43 makes a parallax correction by shifting the view field frame line on LCD 53 when the taking lens 11 is detected to focus on an aimed subject in a camera-to-subject distance longer than the extreme end distance but shorter than the closest focusing distance. LCD 53 functions as both finder view field frame varying means and parallax correction means. Various finders of a type having a variable view field frame are well known to those skilled in the art and may be used in place of LCD 53. The film feeding mechanism 36 feeds the photographic film 48 while measuring an advanced amount of the photographic film 48. The magnetic recording device 40 records trimming-data on a marginal area of the photographic film 48 provided along each exposure frame while feeding the photographic film 48. The electronic flash device 18 emits a flash for a predetermined period of time. The controller 43 allows the electronic flash device 37 to emit a flash when the brightness of an aimed subject is detected to be lower than a predetermined level of brightness and when an aimed subject is at a distance between the closest focusing distance and the extreme end distance.

Figure 3:
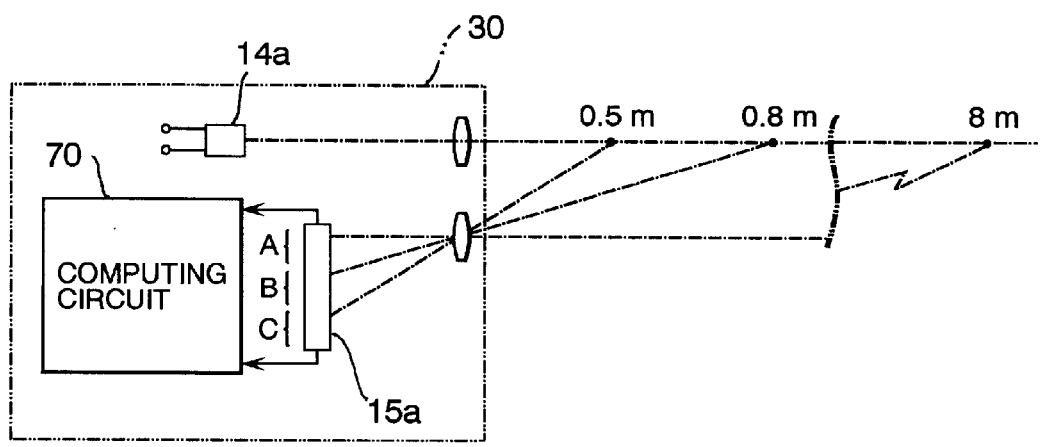
FIG. 3 is an explanatory schematic diagram illustrating a distance measuring device of the photographic camera.

As shown in FIG. 3, the distance measuring device 30 is constituted by a light emitting element 14a disposed behind the light emitting window 14, a light receiving photoelectric element 15a disposed behind the light receiving window 15 and a computing circuit 70. The light emitting element 14a emits near infrared rays toward an aimed subject when the shutter release button 17 is depressed half. The light receiving photoelectric element 15a, which is made of, for example, PSD (semiconductor position detector), receives near infrared rays from the aimed subject at a position thereof corresponding to the camera-to-subject distance and generates a position signal. As is well known in the art, the position signal has a level in conformity with a position in which a light ray impinges on PSD. The computing circuit 70 calculates a camera-to-subject distance on the basis of the position signal and generates a distance signal corresponding to the camera-to-subject distance. A light receiving surface of the light receiving photoelectric element 15a is divided into three zones, one of which receives light only from a normal range from 0.8 m to 8 m away from the photographic camera and is referred to as a normal range photographic zone A, second one of which receives light only from a shorter range from 0.5 m to 0.8 m away from the photographic camera and is referred to as a close-up photographic zone B, and the remaining one of which receives light only from a zone from 0.5 m or nearer to the photographic camera and is referred to as a warning zone C. Reflected rays by an aimed subject at a distance longer than 8.0 m from the photographic camera impinge upon the normal photographic zone A of the light receiving photoelectric element 15a and however are too weak to be effectually and distinctively detect by the photoelectric element 15a. That is to say, the photoelectric element 15a is hard to generate a distinctive level of signal when receiving rays from an object at a distance longer than 8 m from the photographic camera 10 even in the normal photographic zone A. The controller 43 determines that an aimed subject is in an infinite position when the light receiving photoelectric element 15a generates an indistinctive level of signal or does not generate any signal. Accordingly, the distance measuring device 30 has a measurement range from 0.5 m to infinity effective to provide a position signal. Further, the controller 43 provides a warning signal when the distance measuring device 30 receives rays in the warning zone C.

Figure 4:
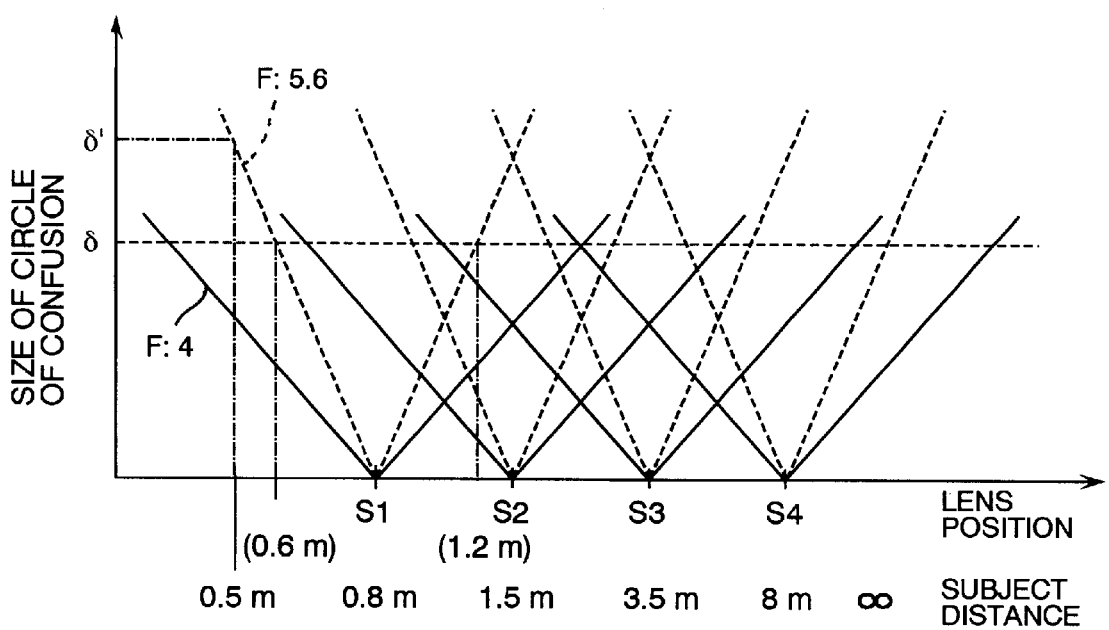
FIG. 4 is a graph showing the relationship between camera-to-subject distance and size of the permissible circle of confusion with respect to scheduled focussing lens set positions.

The focussing lens shift mechanism 41 shifts the focussing lens 11a to one of the fixed focussing lens set positions S1–S5 as shown in FIG. 4 in conformity to camera-to-subject distances, specifically focusing zones, detected by the distance measuring device 30. The focusing lens set position S1 is assigned to a position in which optimum focusing is obtained for an aimed subject at the closest focussing distance of 0.8 m. The focusing lens set positions S2, S3 and S4 are assigned to positions in which optimum focusing is obtained for an aimed subject at distances 1.5 m, 3.5 m and 8.0 m, respectively. Generally, a photographic lens has a depth of field which depends on values or sizes of an aperture, i.e. F-numbers, of the photographic lens. As shown in FIG. 4, the taking lens 11 of the photographic camera 10 shown as an embodiment of the present invention forms an image of an aimed subject at a distance of 0.6 to 1.2 m away from the photographic camera 11 within a permissible range of circles of confusion δ that gives sharpness of the image that is evaluated to have a sufficiently acceptable image quality even when the focussing lens 11a is in the focusing lens set position S1 and the taking lens 11 has an F-number of 5.6 (which is the largest aperture of the programmed shutter 46). Similarly, when the focussing lens 11a is in the focusing lens set position S4, an aimed subject located even at an infinite distance is covered by the depth of field of the taking lens 11. Consequently, an aimed subject located at a distance from 0.6 m to infinity away from the photographic camera can actually be focused due to the depth of field by setting the focussing lens 11a in a selected one of the focussing lens set positions S1–S4 according to a detected camera-to-subject distance detected by the distance measuring device 30 even when the aimed subject is at a shorter distance beyond 0.8 m which is the closest focussing distance of the taking lens 11. However if an aimed subject is located at a distance 0.5 m away from the photographic camera which is the shortest extreme end of the measurement range of the distance measuring device 30, an image of the aimed subject is not focused sharply for acceptable image sharpness because the circle of confusion δ becomes larger than the permissible circle of confusion δ. When stopping down the shutter to an F number of 14, the depth of field of the taking lens 11 is provided with a greater depth of field as shown by a solid line in FIG. 4. In consequence, the aimed subject at a distance of 0.5 m which is the extreme end of the meaurement range of the distance measuring device 30 can be covered by the depth of field as long as the focusing lens 11a is in the focusing lens set position S1, so that the aimed sunject is regarded as being focused sufficiently sharply to have acceptable image quality.

Figure 5A:
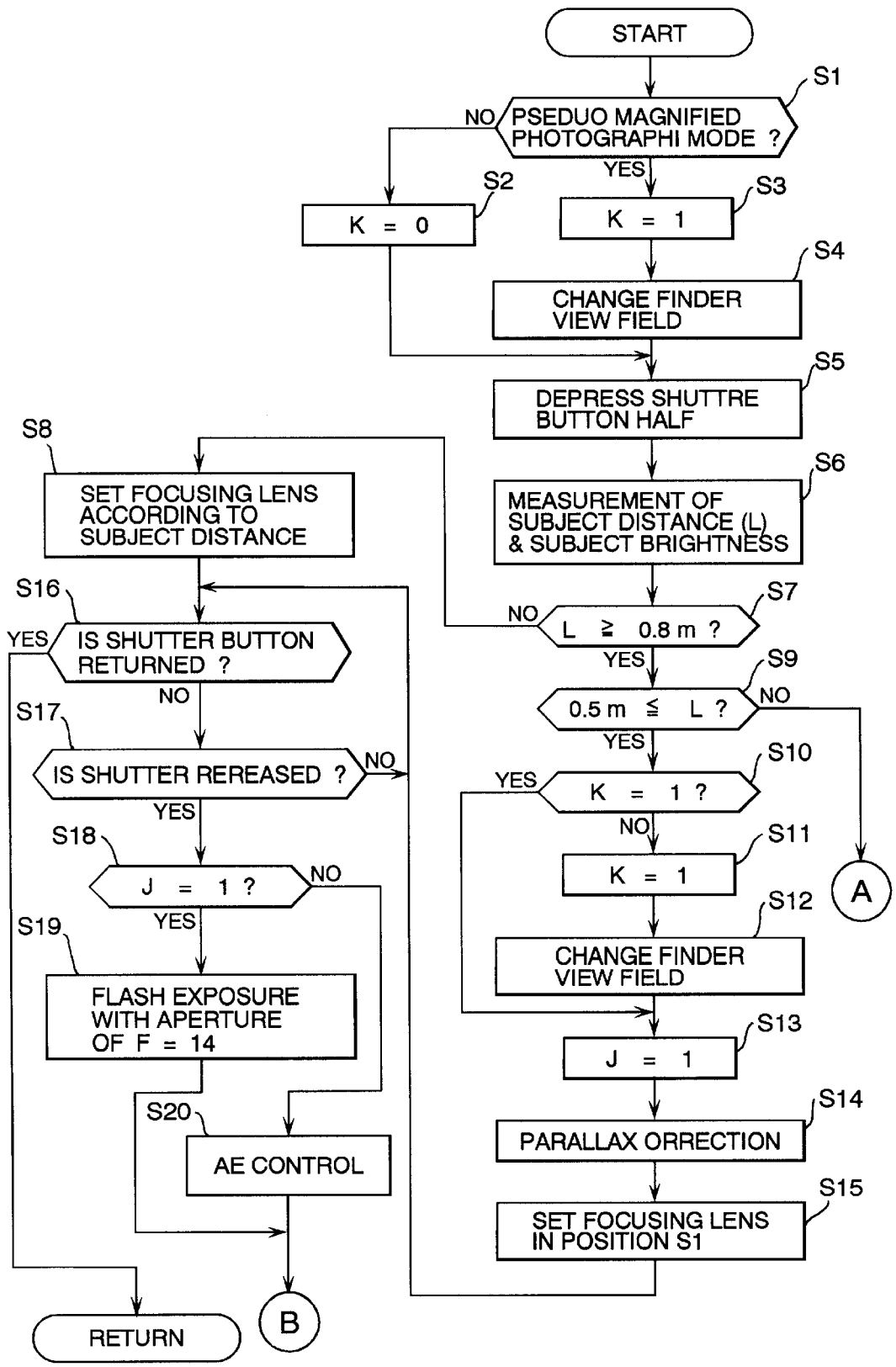
FIGS. 5A and 5B are a flowchart illustrating a sequence routine of camera operation control for a microcomputer of a controller of the photographic camera.
Figure 5B:
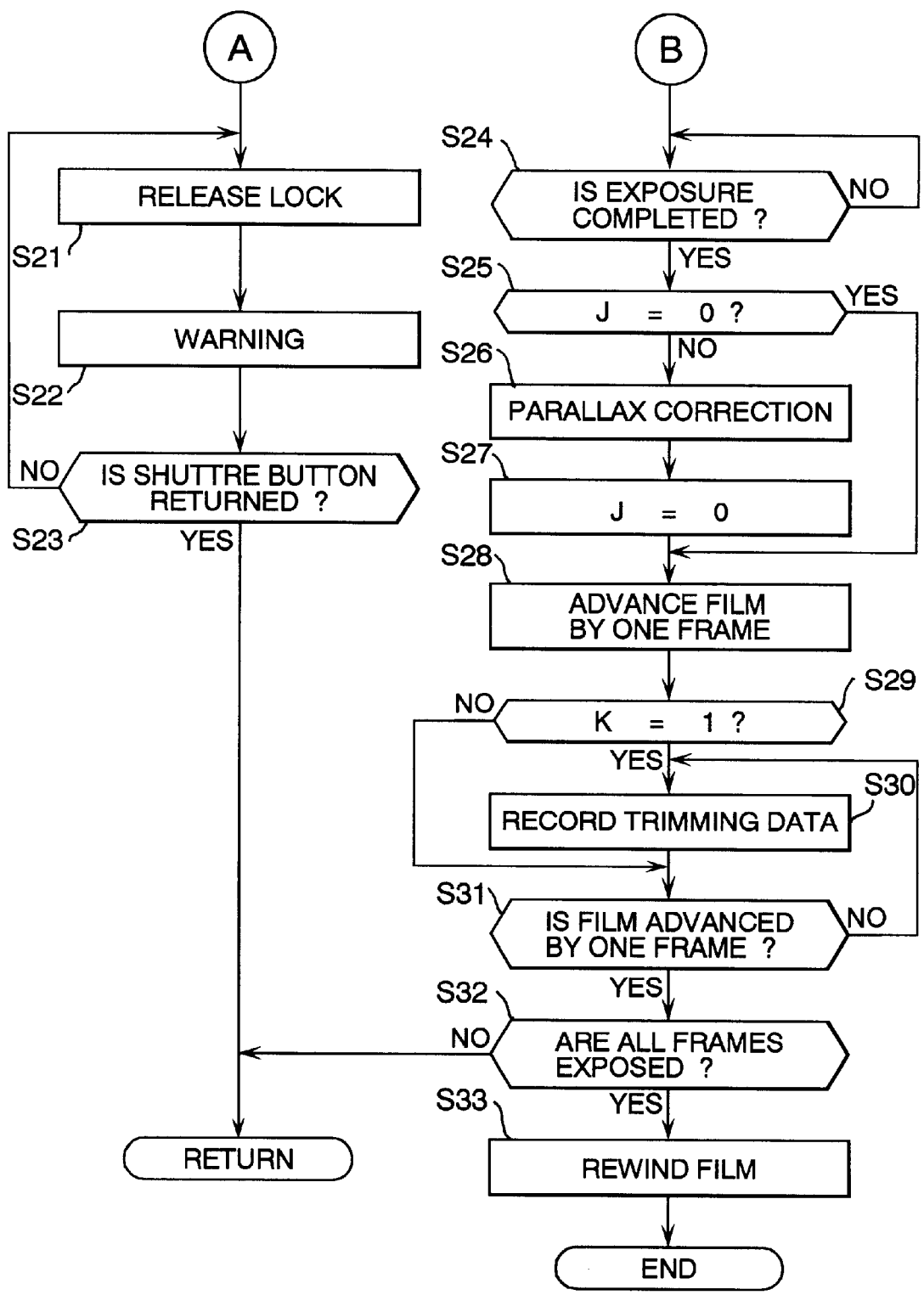
Figure 6:
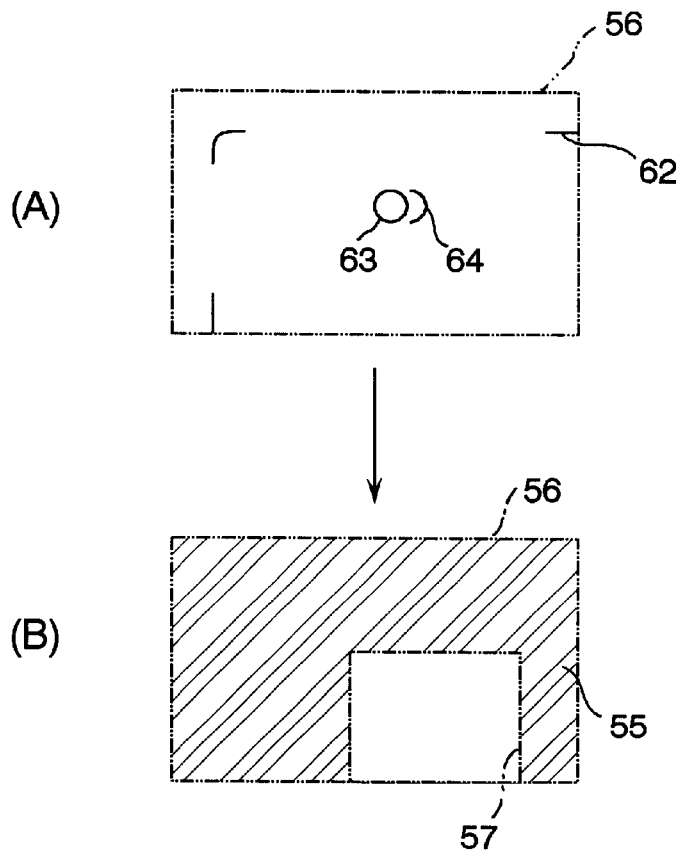
FIG. 6 is an explanatory diagram showing a field view of a finder in which (A) shows a state of the field of view in the normal photographic mode and (B) shows a state of the field of view in a close-up effect photographic mode in a pseudo magnified photographic mode.

The controller 43 implements computer controlled camera operation following a flow chart shown in FIGS. 5 and 6 which illustrates a sequential routine for the microcomputer of the controller 43. Programming a computer is a skill well understood in the art. The following description is written to enable a programmer having ordinary skill in the art to prepare an appropriate program for the microcomputer. The particular details of any such program would of course depend upon the architecture of the particular computer selected.

In the first place, after unlocking the swing lock 24 to open the bottom lid 23, the film cartridge 22 is loaded into the cartridge chamber of the photographic camera 10, and then the bottom lid 23 is closed, which is accompanied by automatic lock of the swing lock 24 for locking the bottom lid 23. Further, after a lapse of the predetermined period of time, the film feeding mechanism 36 is actuated to feed the photographic film 48 so as to place a first exposure frame in an exposure aperture of the photographic camera. In an initial state of the photographic camera, the taking lens 11 is in the wide-angle end with the focussing lens 11a set in the focussing lens set position S4. The zoom finder optical system 32 is correspondingly adjusted to have a field of view in conformity with the field of view of the taking lens 11. In this initial state, LCD 53 in the zoom finder does not display any frame line. Before shooting, either the normal photographic mode or the pseudo magnified photographic mode is selected by operating the mode selecting switch 19 which selects the normal photographic mode in the initial state. Following selection of photographic mode, the sequence logic starts and control proceeds to a first decision at step S1 in FIG. 5 as to the selection of photographic mode. A pseudo magnified mode flag K is set down or reset to a state of "0," which indicates implementation of exposure in the normal photographic mode, at step S2 when the normal photographic mode is selected or up or set to a state of "1," which indicates implementation of exposure in the pseudo magnified photographic mode, at step S3 when the pseudo magnified photographic mode is selected. Upon selecting the pseudo magnified photographic mode, following setting up the pseudo magnified mode flag K, the LCD 53 is actuated to display the view field frame in conformity with the particular portion of the exposure frame of the photographic film 48 which defines an printing area of the exposure frame. The photographer frames an aimed subject by operating the zoom lever 20 looking the aimed subject through the view finder. When the zoom lever 20 is turned toward the telephoto end position "T," the zooming motor 45 rotates in one of opposite directions to actuate the taking lens zooming mechanism 35 and the finder zooming mechanism 33 through a link mechanism schematically shown by a reference number 45a. The taking lens zooming mechanism 35 shifts the second lens group 11b and the third lens group 11 while changing the axial space therebetween in a programmed correlation so as to continuously vary the focal length of the taking lens 11 toward the longest setting, i.e. the telephoto limit. Concurrently, at step S4, the finder zooming mechanism 33 shifts the lens elements 13b and 13c while changing the axial space therebetween in a programmed correlation so as to continuously vary the focal length of the finder optical system 32 in order to provide a field of view of the finder in conformity with that of the taking lens 11. An automatic focussing mark is seen in the central portion of the field of view of the finder. The photographer depresses half the shutter release button 17 at step S5 after framing the aimed subject by using the automatic focussing mark, for example by positioning a desired portion of the aimed subject, for example a face of a human boy, on the automatic focusing mark. The distance measuring device 30 and the light metering device 31 are actuated to start measuring a camera-to-subject distance (L) and metering subject brightness at step S6 and to generate a distance signal and a subject brightness signal in response to the half-depression of the shutter release button 17. Data of the distance signal and the subject brightness signal is written into RAM 39.

Subsequently, a decision is made at step S7 as to whether the camera-to-subject distance (L) is equal to or longer than the closest focussing distance of 0.8 m of the taking lens 11. When the distance signal indicates that the camera-to-subject distance (L) is within the normal range of distances from 0.8 m to infinity, one of the focussing lens set positions S1–S4 is selected according to the distance signal. Then, the motor 45 is driven to actuate the focussing lens moving mechanism 41 so as to shift the focussing lens 11*a* into the selected focusing lens set position at step S8. By this way, the automatic focussing control is completed. Data indicating the relationship between the focussing lens set positions S1–S4 and distance signals are previously stored in ROM 38.

When the distance signal represents a camera-to-subject distance (L) shorter than the closest focussing distance 0.8 m, then another decision is made at step S9 as to whether the camera-to-subject distance (L) is equal to or longer than the extreme end distance of 0.5 m. When the camera-to-subject distance (L) is between the closest focussing distance 0.8 m and the extreme end distance of 0.5 m, the pseudo magnified mode flag K is set up to the state of "1" so as to cause compulsory implementation of exposure in the pseudo magnified photographic mode at step S11 even if the photographic camera has been in the normal photographic mode at step S10. Concurrently, after causing the finder zooming mechanism 33 to shift the lens elements 13*b* and 13*c* while changing the axial space therebetween in the programmed correlation so as to continuously vary the focal length of the finder optical system 32 in order to provide a field of view of the finder for close-up photography at step S12, a close-up mode flag "J" is set up to a state of "1" which indicates implementation of exposure in the close-up photographic mode at step S13. Upon an occurrence of exposure in the close-up photographic mode, the parallax correction is made at step S14 and the focussing lens mechanism 41 is actuated to shift the focusing lens 11*a* of the taking lens into the focusing lens set position S1 according to the data read out from ROM 38 at step S15.

Figure 7:
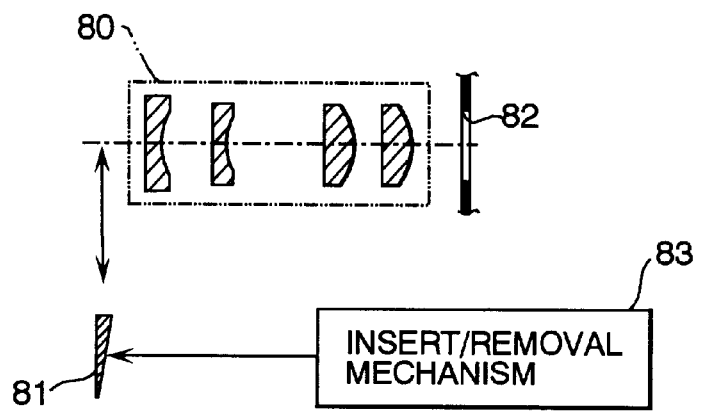
FIG. 7 is an explanatory diagram of a variation of a finder parallax correction.

As shown in FIG. 7(A), the finder has a field of view 56 in the normal photographic mode. In this state, a parallax correction frame 62, an ordinary automatic focussing mark 63 and a close-up automatic focussing mark 64 shifted in position for the parallax correcting frame 62 are displayed on LCD 53. As shown in FIG. 7(B), the parallax correction in the pseudo magnified photographic mode is made by shifting a narrowed view field frame 57 for the pseudo magnified photographic mode to a position in conformity with the extreme end distance of 0.5 m.

Thereafter, a decision is made at step S16 as to half-depression of the shutter release button 17 and subsequently at step S17 as to full-depression of the shutter release button 17. When the half-depression of the shutter release button 17 is removed before fully depressing it. The sequence logic orders return for another implementation of the sequential camera control. Display of the narrowed view field frame 57 is made at a lapse of a specified period of time from the half-depression of the shutter release button 17 because it is made on the basis of the result of detection of the camera-to-subject distance (L) in response to the half-depression of the shutter releae button 17. It is preferable that the narrowed view field frame 57 is controlled to remain displayed for a specified period of time after removing depression of the shutter relase button 17. When the shutter release button 17 is depressed half once again while the narrowed view field frame 57 remains diaplayed, the display of the narrowed view field frame 56 is controlled depending upon camera-to-subject distances at the time of distance detection. Specifically, for example, the narrowed view field frame 57 disappears when the camera-to-subject distance (L) is in the normal range and remains displayed when the camera-to-subject distance (L) is at the extreme end distance.

When the shutter release button 17 is fully depressed at step S17, a decision is made at step S18 as to whether photographic camera is in the close-up photographic mode, namely whether the close-up mode flag J is up (J=1). When it is up, an exposure control signal is transmitted to the programmed shutter 46 so as to keep the programmed shutter 46 from opening beyond an F-number of 14 at most and concurrently to automatically actuate the flash unit 37 to make compulsory flash exposure at step S19. The flash unit 37 is actuated to flash automatically when subject brightness is lower than a predetermined level under the nomal photographic mode or the pseudo magnified photographic mode and, further compulsorily actuated to make flash exposure always in the pseudo close-up photographic mode regardless of levels of subject brightness. Aforementioned F-number of 14 is determined on the basis of a guide number (GN) of the flash unit 37 taking the camera-to-subject distance of 0.5 m into consideration. On the other hand, if the photographic camera is not in the pseudo close-up photographic mode at step S18, ordinary automatic exposure control is implemented at step S20. When the camera-to-subject distance (L) is shorter than the extreme end distance of 0.5 m at step S9, a release lock signal is provided by the distance measuring device 30 to lock the shutter release button 17 at step S21 and display a warning mark, a warning description or the like in the finder at step S22. This release lock signal remains active until the shutter release button 17 is returned at step S23.

After starting an exposure in the pseudo close-up photographic mode at step S19 or under the ordinary automatic exposure control at step S20, a decision is made step S24 as to whether an exposure is completed. Subsequently, a decision is made at step S25 as to whether the close-up mode flag J is down (J=0). If the close-up mode flag J remains up, after removing the parallax correction at step S26 and resetting down the close-up mode flag J to finish exposure control in the pseudo close-up photographic mode at step S27, the film feeding mechanism 36 is actuated to feed the photographic film 48 by one frame at step S28. When the pseudo magnified mode flag K remains up, which indicates that the exposure is made under the pseudo magnified photographic mode, at step S29, trimming-data that indicates that the exposure was made under the pseudo magnified photographic mode is recorded magnetically on the photographic film 48 during feeding the photogrraphic film 48 at step S30.

When the photographic film 48 is fed by one frame at step S31, a decision is made at step S31 as to whether all of the available exposing frames of the photographic film 48 are exposed. After completion of exposures of all available exposure frames at step S32, the film feeding mechanism 36 is actuated to rewind the photographic film 48 fully into the film cartridge 26 at step S33.

The film cartridge 26 is taken out from the photographic camera and placed to a photofinisher.

When making a print from a frame that is exposed in the pseudo magnified photographic mode, a printing magnification is 1.7 times as large as an ordinary printing magnification. This printing magnification is used in a new format printine system in which what is called a panoramic print is made from an regular format of frame with a specific magnification which is 1.7 times as large as an ordinary printing magnification with which an ordinary print is made from the regular format of frame. Accordingly, the conventional printing equipments and a regular size of photographic paper can be used for making prints from the frames exposed in the pseudo magnified photographic mode.

In the above described embodiment of the invention, the particular exposure area of an exposure frame for exposure in the pseudo magnified photographic mode has the same aspect ratio as a ful exposure arear of the exposure frame. Needless to say, the particular exposure area of an exposure frame may have different aspect ratios from that of the ful exposure area In such a case, it is required to record trimming data representative the respective aspect ratios on the photographic film 48 so as to specify the aspect ratios for respective exposed frames, which are picked up by a printer. For making prints from the exposed frames having such different aspect ratios, it is necessary to change printing magnification according to the aspect ratios and to feed the printing paper by different lengths according to the aspect ratios. In the pseudo close-up photographic mode, flash exposure is automatically made under the codition that the maximum aperture of the programmed shutter is limited to a predetermined F-number. Instead it is possible to control the programmed shutter to operate taking data of automatic exposure into consideration after flashing once under an F-number of 14 like day-light synchronous flash exposure. It is not necessary to make compulsory flash exposure in the pseudo close-up photographic mode when the programmed shutter operates with an F-number of 14 in the automatic exposure control only because of a small zooming magnification and high subject brightness. Moreover, on the grounds that that there are apprehensions for poor sharpnes on prints made from frames that exposed by the close-up photographic mode in the pseudo magnified photographic mode, the programmed shutter is compulsorily controlled to provide a snmall aperture with an effect of increasing the depth of field of the taking lens, so as thereby to improve the quality of image, which eliminates compulsory flash exposure.

Aforementioned various numeric values such as the extreme end distance of 0.5 m, the closest focussing distance of 0.8 m, the specific F-number of 14 and the printing magnification of 17 are given as specific examples for explaining the preferred embodiment of the present invention and these conditions are not limited to such numeric values. Further, although the photographic camera of the present invention has been descrived as having a zoom lens provided with focussing lens set positions which are determined on the basis of camera-to-subject distances only as the taking lens 11, in the case where a zoom lens such as consisting of two lens groups has focussing lens set positions which are determined on the basis of both camera-to-subject distances and zooming magnifications, the zoom lens may be provided with sets of focussing lens set positions for the respective zoom magnifications.

In order to change the field of view of the finder, other types of mechanisms may be used in place of LCD. For example, a frame formed with an opening having the same aspect ratio as that of the specific partial area of an exposure frame may be inserted into and removed from the focal plane of the finder optical system as a view field changing frame or a couple of L-shaped plates that are moveable along the diagonal line of the field of view may be used to change the field of view of the finder. As parallax correction means for mechanically changing the field of view of the finder, a wedge type of prism 81 shown in FIG. 8 may be incorporated in addition to LCD. This wedge type prism 81 is inserted into and removed from the light axis of the finder optical system by an insertion/removal mechanism 83 which is known in various formes and take any well known form. As one of surfaces of the wedhe prism 81 intersects to the optical axis at an angle greater or smaller than a right angle, the optical axis itself is diflected by the wedge prism with an effect of causing the field of view of the finder to shift relatively to the whole visible area of the finder.

It is easely understood that the present invention can be applied to other types of photographic camera such as electronic still cameras and cameras equipped with a printing feature.

Although the present invention has been ully described by way of example, vrious other variant and modifications my occur to those skilled in the art. Unless such other variants and modifications depart from the scope of the present invention, they are intended to be covered by the following claims.

What is claimed is:

1. A photographic camera of a type that has a taking lens having a focusing range from a closest focusing distance to infinity and is changeable in photographic mode between a normal photographic mode in which an almost entire area of an exposure frame of a photographic film is exposed with an intention of making a print from the exposure frame with a normal printing magnification and a pseudo magnified photographic mode in which a specific partial area of an exposure frame of a photographic film is exposed with an intention of making a print from the exposure frame with a larger printing magnification than the normal printing magnification and records data of an exposure for a specific exposure frame which indicates that the specific exposure frame has been exposed in the pseudo magnified photographic mode on the photographic film and is intended to be used in printing process, said photographic camera comprising:

distance measuring means for measuring a camera-to-subject distance, which has an extended measurement range having an extreme end distance from the photographic camera shorter than the closest focussing distance of the taking lens by a predetermined distance;

lens setting means for setting the taking lens in position between a closest focusing position for said closest focusing distance to a remotest focusing position for an infinity focusing distance for said infinity in accordance with a camera-to-subject distance measured by said distance measuring means; and control means for setting the taking lens in said closest focussing distance and causing a change in photographic mode from the normal photographic mode to the pseudo magnified photographic mode when said distance measuring means detects a camera-to-subject distance between the closest focussing distance and the extreme end distance.

2. A photographic camera as recited in claim 1, and further comprising an electronic flash device incorporated in said photographic camera, wherein said control means implements automatic exposure control such that said electronic flash device is automatically actuated to flash under a condition that an aperture of the taking lens is stopped down below a predetermined value when said distance measuring means detects a camera-to-subject distance between the closest focussing distance and the extreme end distance.

3. A photographic camera as recited in claim 1, and further comprising a view finder of a type capable of displaying a view field frame in conformity with said specific partial area of an exposure frame and having a mechanism for making a parallax correction of a field of view of said view finder, wherein said control means causes said finder to display said view field frame and said mechanism to make said parallax correction when said distance measuring means detects a camera-to-subject distance between the closest focussing distance and the extreme end distance.

* * * * *